United States Patent Office 3,246,075
Patented Apr. 12, 1966

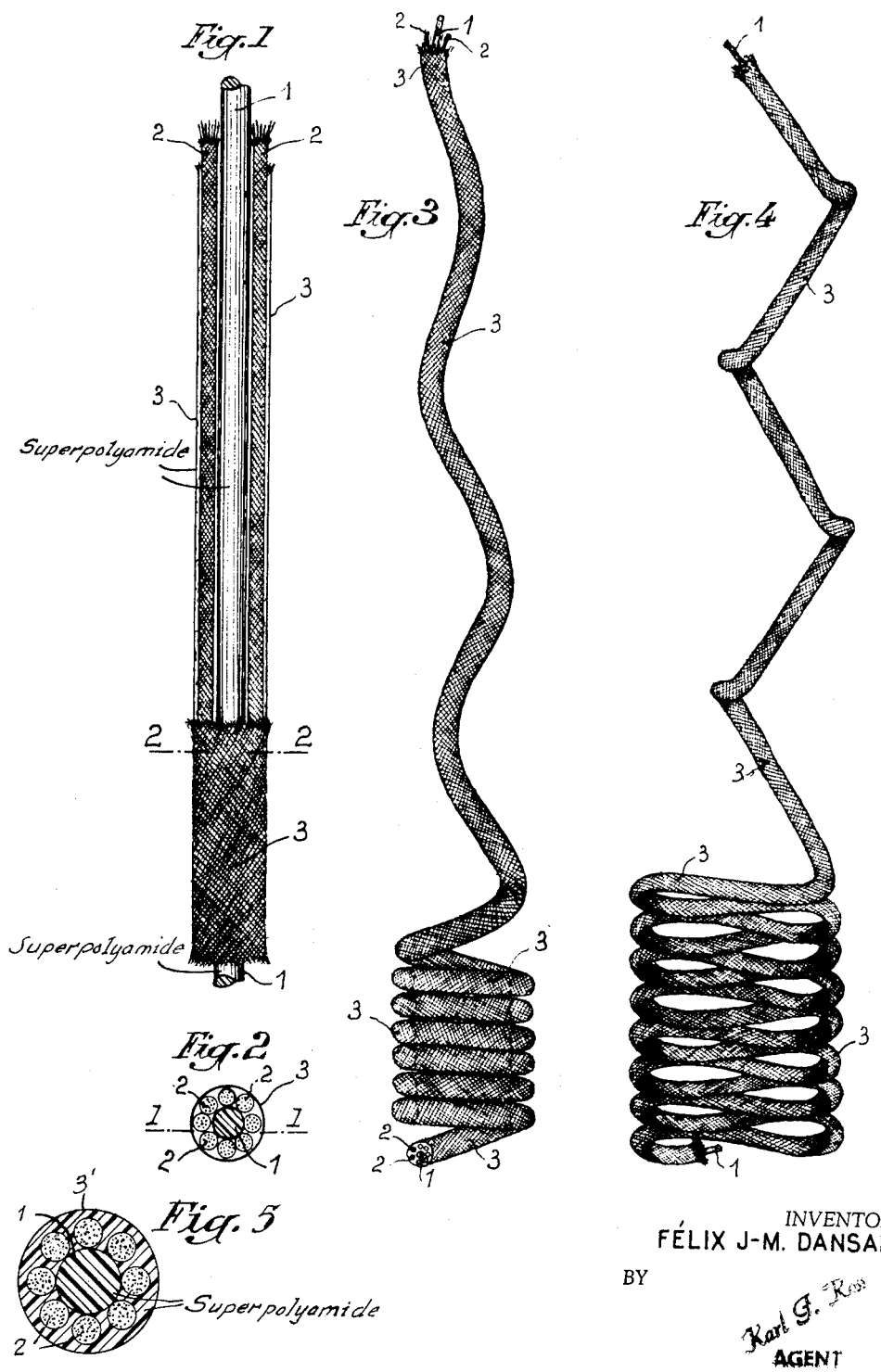

3,246,075
EXTENSIBLE ELECTRIC CABLE
Félix Jean-Marie Dansard, Rue Impasse du Pilat,
Saint-Chamond, Loire, France
Filed June 12, 1963, Ser. No. 287,289
Claims priority, application France June 22, 1962, 8,472,
Patent 1,333,911; Jan. 17, 1963, 8,596
3 Claims. (Cl. 174—69)

Electric conductors in the form of extensible cords adapted to interconnect movable electric apparatus or to connect them to wall outlets or like stationary points, as in the case of telephone receivers or transmitters, portable lamps, electric-shaving apparatus and the like, domestic appliances, etc., have already been proposed.

More specifically, it is known to provide extensible cords formed by a large rubber thread assembled with electric wires inside a braided cover. Such a rubber thread is subjected to an energetic tensioning before braiding of the cord and this tensioning ensures, upon release of the cord, the spiral coiling thereof, which bestows the desired extensibility.

The actual principle underlying the construction of such a cord limits its extensibility since, as a practical matter, the convolutions cannot assume a diameter above about twice the diameter of the braided cord. This arrangement also inherently limits the number of wires to be incorporated with the cord, since the rubber thread loses its ability to form convolutions when the number of wires increases. Lastly, the rubber, being subjected to ageing, loses its elasticity within a comparatively short time and there is no remedy to this since it is impossible to replace the rubber enclosed within the braided cover.

There exist, furthermore, extensible cords constituted by electric wires enclosed within a sheath of plastic material, such as vinyl chloride or even rubber. Such cords are wound helically around cylinders of a diameter of about 12 mm. and are thermally set inside of a kiln at a suitable temperature.

They are then removed from these cylinders in the form of helical cords with convolutions adapted to be extended when subjected to a tractional stress and to return into their original coiled condition when they are no longer subjected to tractional stresses. The extensibility of these latter cords is also limited and they are also subject to alteration with time. Furthermore, they become hard at low temperatures.

With both of the above prior methods, it is practically impossible to obtain helical convolutions leading to a very large extensibility of the cord.

My invention has for its object a novel method which is able to produce extensible coiled electrical cords without the drawbacks of the cords obtained in accordance with prior practice.

According to my invention, I associated with yielding electric wires under a braided cover or a sheath at least one thread-like rigid core element, preferably constituted by a single strand, made of a heat-shrinkable synthetic material, said element being fixed into its geometrical shape upon such heat treatment.

I may use for this purpose, in particular, rigid unshrunk superpolyamide threads for which my invention provides thus a novel application.

By winding, before any heat treatment, a cord thus constituted to any desired geometrical shape, there is obtained after said heat treatment an extensible cord which retains the preset configuration and has a tendency to return naturally to it without any loss of this tendency with time.

The geometrical shape given to the cord is selected as desired and it may be, without this enumeration constituting a limitation, that of a tubular helix, of a flat spiral, of a zig-zag line, of a concertina (i.e. accordian pleated), of an S, or the like.

In order to benefit by all the advantages of such a cord, it is important to resort to highly yieldable leads constituted preferably by suitable copper wire, each protected by an insulating braid or sheath.

The number of wires is not limited and can range between two and twelve or even more.

In the case where the outer cover is constituted by a braided sheath or sleeve, the leads, which have been individually insulated, are positioned inside the central hollow column of a braiding loom, or else independently of each other in the columns of the poppets of said loom.

At the center of such a column, the polyamide core element or elements, preferably each constituted by a single strand, are separated from the wires or associated with them and are positioned in the hollow central column or in a poppet column, the cross-section of said elements being selected in accordance with the result to be obtained and with the number of wires, said polyamide element or elements being also covered if required with a braid of multistrand yieldable polyamide threads.

A cord of this construction, inside which are anchored the electric wires, may be wound over a core or mandrel of any desired diameter. It may also be wound over a conical core or, again, in a plane in the manner of a clock spring. Generally speaking, it may assume any other desired geometrical shape or outline, according to its intended use.

Whatever may be the shape given to the cord, it is subjected to heat treatment at a temperature below the melting point of the rigid unshrunk polyamide core element or elements. The core then shrinks under the action of heat and is fixed in a final shape corresponding to the shape which has been given to it; the core elements thus impart their configurations to the system of wires with which they are enclosed inside the outer braided covering.

As disclosed above, the braid forming the outer coat or cover may be replaced by an unbraided sheath. The latter is made of plastic material, preferably of the same nature, say a superpolyamide, as the single-strand core element or elements which ensure the extensibility of the cord. Said sheath may be obtained directly through direct extrusion over the cord constituted by one or more single-strand elements and the electric wires.

The sheath may also be made separately, i.e. as a tube into which the single strand element or elements are introduced with the electric wires.

The sheath of superpolyamide material does not reduce to any extent the yielding character of the cord and ensures an excellent protection both from a mechanical standpoint and with regard to isolation of the conductors from moisture.

It will thus be readily understood that it is possible to produce cords having considerable extensibility and a highly yieldable character with, however, small bulk, as a consequence of properties of the superpolyamide core element or elements; these properties are not altered with time.

Thus, a cord having a diameter of 28 mm. and assuming when inoperative a length of 1 m. may be stretched up to a length of 12 m.

The significance of such a cord as an electric lead feeding domestic electric appliances, such as vacuum cleaners and polishing machines, is obvious. As a matter of fact, the cord has a reduced bulk and offers no risk of entangling so that it may be connected with a wall outlet and with the domestic appliance without sweeping over the ground and without hindering the operator.

On the other hand, it is an easy matter to give the cord any desired shape and this leads to a further advantage in that, in the case of an electric shaving apparatus, the cord may be given a shape such that it may be fitted inside the box carrying the shaving apparatus without making it necessary to wind it into shape beforehand.

My invention will be readily understood from the following description, reference being made to the accompanying drawing. In said drawing:

FIG. 1 illustrates, partly in longitudinal cross-section (taken along line 1—1 of FIG. 2), a cord before its heat treatment;

FIG. 2 is a cross-section taken on the line 2—2 of FIG. 1;

FIGS. 3 and 4 illustrate, on a smaller scale, such a cord after a heat treatment, respectively in the case of a tubular winding and of an S-shaped winding, a portion of the cord being shown in the stretched condition and another section being unstretched; and FIG. 5 is a view similar to FIG. 2, showing a modification.

In the different figures rigid single-strand polyamide cord element 1 in its unsshrunk condition is flanked by leads 2 constituted by copper wires inside respective braided covers made of multistrand polyamide threads or in a sheath of the same material. An outer braid or sheath 3 surrounds the assembly in which the wires extend parallel to and are axially spaced around the core element 1.

To obtain the extensible cord illustrated in FIG. 3, the cord illustrated in FIG. 1 is wound into a helical shape with joining convolutions over a cylindrical core or mandrel and is subjected, when thus wound, to a heat treatment which shrinks the polyamide core element and fixes it permanently in its wound shape.

FIG. 4 illustrates another embodiment obtained by subjecting the cord illustrated in FIG. 1 to a heat treatment after the cord has been wound into an S-shape.

Obviously and as apparent from the preceding disclosure, my invention is by no means limited to the example illustrated but covers all the modifications thereof falling within the scope of the accompanying claims; the element 1 may be single or multiple and may include one or more strands and the number of wires and the shape given to the wound cord may be selected as desired.

My invention relates also to the case where the cord is not obtained through juxtaposition of one or more polyamide elements and of one or more electric leads inside a braid or a sheath but, as shown in FIG. 5, is obtained through a molding over said wires and elements of a layer 3′ of powder made of superpolyamide or like synthetic material having equivalent properties.

What I claim is:

1. An extensible electric cord, comprising a central core consisting of a heat-set convoluted monofilamentary polyamide thread; a plurality of mutually insulated flexible conductors surrounding said core, each of said conductors extending parallel to the axis of said thread throughout the length thereof and disposed along said core; and means including a flexible outer covering maintaining said conductors and said thread in a substantially fixed position relative to one another.

2. A cord as defined in claim 1 wherein said thread has a diameter greater than that of any one of said conductors.

3. A cord as defined in claim 1 wherein said covering is made at least in part of polyamide.

References Cited by the Examiner
UNITED STATES PATENTS

| | | | |
|---|---|---|---|
| 2,450,429 | 10/1948 | Henning | 174—113 |
| 2,573,439 | 10/1951 | Henning | 174—69 |
| 3,037,068 | 5/1962 | Wessel | 174—69 |

ROBERT K. SCHAEFER, *Primary Examiner.*

JOHN P. WILDMAN, JOHN F. BURNS, *Examiners.*

S. DAVID, D. L. CLAY, *Assistant Examiners.*